United States Patent Office 2,924,525
Patented Feb. 9, 1960

2,924,525

POULTRY TREATMENT FOR SKIN PIGMENTATION

Norman F. Kruse and William W. Cravens, Decatur, Ind., assignors to Central Soya Company, Inc., Fort Wayne, Ind., a corporation of Indiana No Drawing. Application June 3, 1957
Serial No. 662,987

5 Claims. (Cl. 99—4)

This invention relates to a poultry treatment for skin pigmentation through the use of soybean xanthophylls. This invention is particularly useful in providing great flexibility in the formulation of feeds for poultry, and particularly chickens and turkeys, and in solving the problem of shortage in xanthophylls while utilizing a by-product or waste product in the soybean industry for feeding purposes.

It is well recognized in poultry nutrition that as a result of feeding of xanthophyll to certain varieties of fowl—usually incorporated in corn, corn gluten meal, dehydrated alfalfa, and in the form of various concentrates of these ingredients—pigmentation of the skin occurs. Skin pigmentation is highly desirable in marketing poultry products. In certain areas, where xanthophyll-deficient grains are extensively used, there also may be a problem of obtaining desirable coloring of egg yolk. This again can be achieved by boosting the xanthophyll content of a laying ration.

One of the chronic problems in poultry feed formulations for some years has been the finding of an economical source of xanthophyll. The most common source of xanthophyll is yellow corn. The quantities of this ingredient used in feeds, however, are not sufficient to supply optimum pigmentation. Corn gluten meal has been added, therefore, in most cases, as a primary supplementary source of xanthophyll. Dehydrated alfalfa and various xanthophyll concentrates are also considered as possible sources.

There are certain disadvantages in using these conventional supplements. Laboratory findings indicated great variations in the xanthophyll content of corn gluten meal (105–255 mcg./gm.) from time to time, and even with good quality gluten meal, approximately 5% has to be added to give satisfactory, but not outstanding, carcass rating. Current production of corn gluten meal ranges from 200 to 250 thousand tons annually. If all production of corn gluten meal were exclusively assigned to broiler feeds, there would not be sufficient gluten meal to provide the minimum level in this quantity for the estimated 6 million tons of broiler feeds produced annually in this country.

Research publications reveal that xanthophyll in dehydrated alfalfa (150–500 mcg./gm.) is not as effectively utilized as from other sources, and also is subject to a much higher degree of instability. Furthermore, extensive use of alfalfa meal in high energy broiler feeds interferes with feed efficiency objectives by reason of the resultant higher fiber and lower energy content of such feeds.

Commercial concentrates of xanthophyll from various feed ingredients to date are very expensive and cannot be produced in large quantities.

Soybean oil itself and the most common by-products of soybean oil have never been considered as a potential source for pigmentation. The reasons for this are the relatively low xanthophyll content of the oil and lecithin, and the fact that the soapstocks are generally acidulated, whereby the xanthophyll is destroyed.

Other problems relating to feeds for poultry have to do with better feed absorption, the dustiness of the product, and its lack of free-flowing particles. Further, when ingredients such as corn gluten meal, alfalfa, etc., are employed, there is difficulty in obtaining the proper balance in the formulation, and the desired flexibility of formulation is lacking. For example, it is often necessary to incorporate more corn gluten meal than is desired from the standpoint of a balanced feed, and in the case of alfalfa, there is considerable instability which affects the performance of a feed after movement through marketing channels. There has long been a need for a source of xanthophyll which would be free of undesirable qualities affecting the formulation flexibility while at the same time having properties aiding better feed absorption by the poultry, reducing the dustiness of the product, increasing the free-flowing characteristic of the product, etc.

We have discovered that while soybean meal and soybean oil itself has a relatively low xanthophyll content, it is possible to obtain a surprisingly large concentration of stable and easily available xanthophyll in fractions that occur during soybean processing. We have found that certain soybean oil products, such as soapstocks, concentrates obtained by solvent extraction of soapstocks, pigments recovered from decolorization processes of the oil under inert or alkaline conditions, or pigments removed from alkaline bleaching earths and adsorbents, enable an effective feed to be produced of high stability and which can be efficiently utilized by poultry while effecting the desired pigmentation thereof. There is thus permitted a high flexibility in formulation and a high stability in the resultant feed.

Soybean xanthophyll has much higher stability and is utilized with greater feed efficiency than the conventional xanthophyll supplements heretofore employed.

An object of the present invention is to provide a means for treating poultry through the employment of materials with feeds for the pigmentation of poultry and the efficient utilization by the poultry of the feed. Another object is to employ soybean oil soapstocks, concentrates obtained by solvent extraction of soapstocks, pigments recovered from decolorization processes of the oil under inert or alkaline conditions, or pigments removed from alkaline bleaching earths and adsorbents, to provide highly flexible feed formulations which are stable and which may be efficiently utilized in the pigmentation of broilers. Still another object is to provide a feed composition in which soapstocks are employed for increasing the pelletability of the feed materials while also providing a nonpelleted feed substantially free of dust and having free-flowing properties. Other specific objects and advantages will appear as the specification proceeds.

The following is the xanthophyll content of an average quality feed ingredient and an average quality soybean oil product:

| Ingredient | Xanthophyll, mcg./gm. |
|---|---|
| 1. Milo | 3 |
| 2. Soybean Oil Meal | 2 |
| 3. Corn | 22 |
| 4. Corn Gluten Meal | 154 |
| 5. Dehydrated Alfalfa | [1] 330 |
| 6. Crude Soybean Oil | 67 |
| 7. Lecithin (dry) | 214 |

[1] Not efficiently utilized.

In contrast with the above, we have discovered that a surprising amount of xanthophyll can be obtained from soybean oil fractions obtained in the processing of the soybean oil. For example, the following fractions have the indicated xanthophyll content:

| Ingredient | Xanthophyll, mcg./gm. |
| --- | --- |
| 8. Soybean soapstock from Crude Oil (dry) | 1,000 |
| 9. Soybean soapstock from Degummed Oil (40% moisture) | 1,050 |
| 10. Soybean soapstock from Degummed Oil (dry) | 1,750 |
| 11. Pigments recovered from alkaline adsorbents | 3,250 |
| 12. Pigments from selective solvent decolorization | 3,700 |
| 13. Concentrate from soapstock | 10,500 |

From the above, it will appear that the soapstock, etc. by-products provide an excellent source of xanthophyll while at the same time, because of the alkaline or the inert milieu in which these products are prepared, their xanthophyll content is well preserved.

Soybean oil soapstock can be used as is, or dried in formulations. The alkaline nature of soapstock will protect its xanthopyll from rapid storage deterioration. Color bodies or pigments from various decolorization processes can yield the multiple amount of xanthophyll that is found in soapstock. They can be added directly to the formulas. Nevertheless, soapstock lends itself as an ideal carrier for these materials because of its alkalinity, tocopherol and phosphatide content, which attributes make soapstock a good antioxidant.

Typical examples for producing color concentrates under alkaline or inert conditions are the selective solvent extration decolorization processes, extraction of pigments from soapstock with organic solvents, treatment of soybean oil miscella with inert adsorbents, alkaline earths or ion-exchange resins, such as aluminum oxide, tricalcium phosphate, Culligan adsorbent, calcium carbonate, etc. By adding these color bodies directly to the feed, to soapstock or to other suitable carrier, any desired concentration of xanthophyll can be prepared and incorporated into poultry formulas.

In addition to the above advantages, we find that the soapstock or the soapstock concentrate has emulsifying action in the intestinal tract which aids better feed adsorption; it eliminates the dustiness of the product, causes the feed to have free-flowing particles, and provides a lubricating effect which reduces frictional heat in pelletizing the feeds. The soapstock has high caloric value, a high unsaturated fatty acid content, gives the feed a better color.

Soapstock is the residue obtained in the alkaline refining of soybean oil, and this contains a saponified fatty acid fraction, a phosphatide and stearol fraction, together with some of the pigments of the oil. It is a known market commodity. It is a high energy source, containing approximately 70% of fatty acids. Its emulsified character and surfactant properties aid in the absorption of feed, as heretofore stated. The alkaline character of the material aids greatly in stabilizing the xanthophyll content.

On a wet basis, we prefer to add approximately 2-4% of the soapstock to the feed. On a dry basis, we prefer to add approximately 1-2% soapstock to the feed. Not only is the amount added extremely small while at the same time giving the desired pigmentation, but the added material has a higher energy content, and by reason of its effectiveness in producing good coloration, great flexibility is permitted in the formulation of the feeds.

While the literature has indicated that there are small amounts of xanthophyll in soybean oil, it came as a surprise to us to find the large concentration of xanthophyll in the soapstock and other named fractions of the soybean oil and to find further the high content of xanthophyll in an alkaline medium by which it is stabilized.

A concentration of xanthophyll can be prepared from the soapstock by the use of acetone or other selective solvents. The concentrate can also be prepared by the use of alkaline earths or other inert adsorbents on crude or degummed soybean oil. Such a concentrate may be stabilized with any alkali, as, for example, sodium hydroxide. Where alkaline adsorbents, alkaline bleaching earths or alkaline resins are employed, the concentrate is obtained in an alkaline or inert condition affording high stability. A further concentration is usually obtained by eluting the pigments from the adsorbents.

Since .1-3% of soybean oil xanthophyll material added to the feed can give excellent results by furnishing part or all of the 10,000-12,000 units (mcg.) of xanthophyll per pound of feed over a period of 3-4 weeks of feeding which is necessary for good pigmentation, it affords great flexibility in formulation by permitting the addition of more economical ingredients which are equivalent or even superior to the conventional xanthophyll contributing ingredients, i.e., gluten meal, dehydrated alfalfa, etc., in regard to caloric content or protein quality. One unit, as referred to above, equals one microgram.

By way of illustration, the following rations have been used for broilers and will be designated in the examples to follow as the basal diets: Concentrate (to be mixed with local grain).

NOTE.—If 70% corn is used, this will supply 7000 units of the necessary 12,000. This means that 30% of a protein-vitamin-mineral concentrate must supply 5000 additional units in the ration or 5000×3.33=16,660 units per pound.

This can be done the conventional way by incorporating into the concentrate:

| | Units |
| --- | --- |
| 15% corn gluten meal×70,000 | 10,500 |
| 4% dehydrated alfalfa×150,000 | 6,000 |
| | 16,500 |

Broiler feed:
| | |
| --- | --- |
| 70% corn×10,000 | 7,000 |
| 5% corn gluten meal×70,000 | 3,500 |
| 1% dehydrated alfalfa×150,000 | 1,500 |
| | 12,000 |

The following examples will illustrate the economics and flexibility of formulation as provided by this invention:

*Example I*

Concentrates:                                               Units
| | |
| --- | --- |
| 10% corn gluten meal×70,000 | 7,000 |
| 2% soybean oil soapstock (crude, dry) (1000 mcg./gm.) (454,000×.02) | 9,080 |
| | 16,080 |

Replacement of xanthophyll from 5% corn gluten meal and 4% dehydrated alfalfa by 2% dry soybean oil soapstock in the conventional formula.

*Example II*

Concentrates:                                               Units
| | |
| --- | --- |
| 1% corn gluten meal×70,000 | 700 |
| 2% soybean oil soapstock (degummed, dry) (1750 mcg./gm.) | 15,900 |
| | 16,600 |

Replacement of xanthophyll by 14% corn gluten meal and 4% dehydated alfalfa by 2% dry soybean soapstock from degummed oil.

*Example III*

Concentrates:                                               Units
| | |
| --- | --- |
| 10% corn gluten meal×70,000 | 7,000 |
| 2% soybean soapstock from degummed oil (40% moisture) (1050 mcg./gm.) | 9,500 |
| | 16,500 |

Replacement of xanthophyll from 5% corn gluten meal and 4% dehydrated alfalfa by 2% undried (40% moisture) soybean soapstock from degummed oil.

Example IV

| Concentrate: | Units |
|---|---|
| 2% corn gluten meal×70,000 | 1,400 |
| 1% xanthophyll pigments recovered from soybean oil miscella by treating miscella on a Culligan adsorption column (3250 mcg./gm.) | 14,750 |
| | 16,150 |

Replacement of xanthophyll from 13% corn gluten meal and 4% dehydrated alfalfa by 1% xanthophyll pigment concentrate obtained from soybean oil on a Culligan adsorption column.

Example V

| Concentrate: | Units |
|---|---|
| 11% corn gluten meal×70,000 | 7,700 |
| .5% color bodies obtained by the selective solvent extraction decolorization process of soybean oil (3700 mcg./gm.) | 8,400 |
| | 16,100 |

Replacement of xanthophyll from 4% corn gluten meal and 4% dehydrated alfalfa by .5% color bodies obtained by the selective solvent decolorization of soybean oil.

Example VI

| Concentrate: | Units |
|---|---|
| 10% corn gluten meal×70,000 | 7,000 |
| 0.2% xanthophyll concentrate obtained by solvent extraction of soybean soapstock (10,500 mcg./gm.) | 9,500 |
| | 16,500 |

Replacement of xanthophyll from 5% gluten meal and 4% dehydrated alfalfa by .2% xanthophyll concentrate obtained by solvent extraction of soybean soapstock.

Example VII

| Concentrate: | Units |
|---|---|
| 1% dehydrated alfalfa | 1,500 |
| 8.5% corn gluten meal×70,000 | 5,950 |
| .5% mixture of 3 parts of xanthophyll concentrate described in Example VI and 7 parts of wet soybean soapstock (carrier) described in Example III (3,885 mcg./gm.) | 8,825 |
| | 16,275 |

Replacement of xanthophyll from 6.5% corn gluten meal and 3% dehydrated alfalfa by .5% soybean oil xanthophyll concentrate in a soapstock carrier.

Example VIII

| Feed: | Units |
|---|---|
| 70% corn×10,000 | 7,000 |
| 1% corn gluten meal×70,000 | 700 |
| 1% soybean oil soapstock, (crude, dry) (1000 mcg./gm.) | 4,540 |
| | 12,240 |

Replacement of xanthophyll from 4% corn gluten meal and 1% dehydrated alfalfa by 1% of dry soybean oil soapstock.

Example IX

| Feed: | Units |
|---|---|
| 30% milo or wheat | Negligible |
| 40% corn×10,000 | 4,000 |
| 5% corn gluten meal×70,000 | 3,500 |
| 1% soybean soapstock from degummed oil (40% moisture) (1050 mcg./gm.) | 4,750 |
| | 12,250 |

Replacement of xanthophyll equivalent to 30% of corn and 1% dehydrated alfalfa by 1% wet soybean soapstock from degummed oil.

Example X

| Feed: | Units |
|---|---|
| 70% milo | Negligible |
| 4% corn gluten meal×70,000 | 2,800 |
| .2% xanthophyll concentrate from solvent extraction of soybean soapstock (10,500 mcg./gm.) | 9,500 |
| | 12,300 |

Replacement of xanthophyll equivalent to 70% corn, 1% corn gluten meal and 1% dehydrated alfalfa by .2% xanthophyll concentrate from soybean soapstock.

Example XI

*Xanthophyll supplement.*—Mixture of 9 parts of xanthophyll concentrate from solvent extraction of soybean soapstock and 1 part of wet (40% moisture) soybean soapstock from degummed oil.

| | Units |
|---|---|
| 10,500×.9 | 9,450 |
| 1,050×.1 | 105 |
| | 9,555 |

Example XII

The following diets were fed to chickens and at the end of the feeding test the depot fat of broilers was extracted and analyzed spectrophotometrically at 436 mu.

| Diets | Xanthophyll, mcg./gm. | 1% E 1 cm. at 436 mu. | Pigmentation Index [1] |
|---|---|---|---|
| 1. 70% Wheat Basal | 3.53 | .0103 | 63.0 |
| 2. 70% Wheat Basal + 2% Degummed Oil Soapstock | 20.85 | .0331 | 203 |
| 3. 70% Wheat Basal + 4% Degummed Oil Soapstock | 40.00 | .0473 | 290 |
| 4. 30% Wheat Basal + 40% Corn + 2% Corn Gluten Meal | 16.78 | .0167 | 102 |
| 5. 30% Wheat Basal + 40% Corn + 2% Corn Gluten Meal + 3% Crude Oil Soapstock | 27.60 | .0203 | 124 |
| 6. 30% Wheat Basal + 40% Corn + 2% 2% Corn Gluten Meal + 6% Crude Oil Soapstock | 34.75 | .0312 | 191 |
| 7. 30% Wheat Basal + 40% Corn + 2% Corn Gluten Meal + 3% Mixed Degummed and Crude Oil Soapstock | 28.00 | .0261 | 160 |
| 8. 30% Wheat Basal + 40% Corn + 2% Corn Gluten Meal + 6% Mixed Degummed and Crude Oil Soapstock | 38.50 | .0337 | 201 |
| 9. Control Commercial Broiler Feed | 26.33 | .0163 | 100 |
| 10. 70% Corn Basal + 1½% Degummed Oil Soapstock | 37.10 | .0258 | 158 |
| 11. 70% Corn Basal + 3% Degummed Oil Soapstock | 50.00 | .0348 | 213 |
| 12. 70% Corn Basal + 10% Corn Gluten Meal + 3% Alfalfa | 49.25 | .0284 | 174 |

[1] Percentage values are based on sample #9, a commercial broiler feed at 100.

These results show the direct relationship between xanthophyll content of the diet and pigment deposition in the fowl. It is also apparent that the addition of a soybean xanthophyll source gives a response similar to or better than that obtained by xanthophyll derived from conventional feed ingredients.

As heretofore indicated, there is obtained through the soybean oil fraction, such as soapstock, decolorizing or bleaching operations, etc., a xanthophyll concentrate having 1000 or more micrograms/gm. of xanthophyll, the content running from 1000 micrograms/gm. in the soybean soapstock from crude oil (dry), up to 10,500 micrograms/gm. from a concentrate from soapstock. The percentage of the vehicle will be increased or diminished depending upon the vehicle content of xanthophyll. For the purpose of stability, it is preferred to have the composition either alkaline or neutral.

The feed may be in the form of final feed or in a concentrate such as a broiler concentrate. If it is desired that in the final feed there be a certain percentage of the soybean oil fraction, a concentrate may be prepared for convenience in sale and shipping, the concentrate having, of course, a larger percentage than will be needed for the final feed supplied to the poultry, the poultry farmer supplying additional feed components. We find that an effective feed composition for the treatment of poultry to effect the various results herein described may contain, in addition to the normal poultry feed components containing from 0.1 to 8.0% of a soybean oil fraction containing at least 400 units of xanthophyll per gram of said fraction. Where the unitage is higher, say between 3,000 to 50,000 units, the oil fraction should be in the range of .05 to 1.0%, depending upon the degree of pigmentation desired for the poultry skin, eggs, etc. Lecithin sludge may be used along with the other soybean oil fractions, and we prefer to use it in a dry form. While the soapstock and other fractions may be mixed with the feed at any stage, we find that best results are obtained when the soapstock, etc. is dried prior to mixing with the feed. In any event, the relative amount of the soybean oil fraction is so small that great flexibility is permitted in the feed formulations, and the nutriments supplied by the other feed components in the mixture can be furnished to the poultry in the desired proportions, little attention being required for the xanthophyll content since it is supplied in a concentrated form by the small amount of the soybean oil fraction.

While, in the foregoing specification, we have set forth specific compositions or examples in considerable detail for the purpose of illustrating the invention, it will be understood that such details may be varied widely by those skilled in the art without departing from the spirit of our invention.

We claim:

1. In a process for skin pigmentation of poultry, the steps of alkali-refining soybean oil containing xanthophyll to form soapstock, which collects the xanthophyll therein in a concentrate having at least 400 units of xanthophyll per gram of soapstock on a dry basis, separating the soapstock from the refined soybean oil, and drying and mixing at least approximately 1% on a wet basis of said soapstock which is alkaline in character and contains said concentrate of xanthophyll with poultry feed.

2. The process of claim 1 in which said soapstock is dried prior to admixture with the poultry feed.

3. The process of claim 1 in which said soapstock is dried in admixture with dried poultry feed.

4. In a process for skin pigmentation of poultry, and for the pigmentation of the poultry egg yolks, the steps of alkali-refining soybean oil containing xanthophyll to form soapstock which collects xanthophyll therein in a concentrate having at least 400 units of xanthophyll per gram of soapstock on a dry basis, separating the soapstock from the refined soybean oil, and drying and mixing at least approximately 1% on a dry basis of said soapstock which is alkaline in character with poultry feed.

5. In a process for coloring egg yolks and for poultry skin pigmentation, the steps of alkali-refining soybean oil containing xanthophyll to form soapstock which collects xanthophyll therein in a concentrate having at least 400 units of xanthophyll per gram of soapstock on a dry basis, separating the soapstock from the refined soaybean oil, and drying and mixing at least approximately 1% on a wet basis of said soapstock which is alkaline in character with poultry feed which is inadequate in xanthophyll content for effective pigmentation, whereby said soapstock is the major source in the feed for said pigmentation.

References Cited in the file of this patent

UNITED STATES PATENTS

| | | |
|---|---|---|
| 2,168,532 | McMath et al. | Aug. 8, 1939 |
| 2,303,466 | Hunter et al. | Dec. 1, 1942 |
| 2,504,159 | Singer et al. | Apr. 18, 1950 |
| 2,746,864 | Pack et al. | May 22, 1956 |
| 2,835,584 | Rosenberg | May 20, 1958 |

OTHER REFERENCES

Pack et al.: Jr. Am. Oil Chem. Soc., November 1955, vol. 32, pp. 551–553.